(12) United States Patent
Fisher (10) Patent No.: US 9,688,185 B2
(45) Date of Patent: Jun. 27, 2017

(54) CORNER LIGHT ASSEMBLY FOR EMERGENCY VEHICLE

(71) Applicant: Halcore Group, Inc., Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 121 days.

(21) Appl. No.: 14/631,580

(22) Filed: Feb. 25, 2015

(65) Prior Publication Data

US 2015/0251592 A1    Sep. 10, 2015

Related U.S. Application Data (60) Provisional application No. 61/948,354, filed on Mar. 5, 2014.

(51) Int. Cl.
*B60Q 1/00* (2006.01)
*B60Q 1/26* (2006.01)
*B60Q 1/50* (2006.01)

(52) U.S. Cl.
CPC .......... *B60Q 1/2611* (2013.01); *B60Q 1/2615* (2013.01); *B60Q 1/503* (2013.01)

(58) Field of Classification Search
CPC ... B60Q 1/2611; F21V 17/10; F21V 17/1648; F21V 17/108
See application file for complete search history.

(56) References Cited

U.S. PATENT DOCUMENTS

| | | | |
|---|---|---|---|
| 5,335,411 A | 8/1994 | Muller et al. | |
| 5,528,812 A | 6/1996 | Muller | |
| 5,716,127 A * | 2/1998 | Menke | B60Q 1/2611 362/307 |
| 5,826,965 A * | 10/1998 | Lyons | B60Q 1/2611 362/238 |
| 6,179,431 B1 * | 1/2001 | Chien | F21L 4/02 362/184 |
| 7,681,298 B2 | 3/2010 | Babej | |
| 8,210,315 B2 | 7/2012 | Diehl et al. | |

(Continued)

FOREIGN PATENT DOCUMENTS

| | | | |
|---|---|---|---|
| DE | 3828924 A1 | 3/1990 | |
| EP | 1000805 B1 | 3/2006 | |
| ES | 2208040 A1 * | 6/2004 | B60P 3/14 |

*Primary Examiner* — Sean Gramling
*Assistant Examiner* — Gerald J Sufleta, II
(74) *Attorney, Agent, or Firm* — Hovey Williams LLP (57) ABSTRACT

A corner light assembly for an emergency vehicle. The light assembly comprises a first side crown section configured to extend laterally along at least a portion of a first side of a body of the emergency vehicle, a second side crown section configured to extend laterally along at least a portion of a second side of the body of the emergency vehicle, and a central crown section positioned between the first and second crown sections. The light assembly additionally comprises at least one light element including a light source, secured to an exterior surface of one of the first side, second side, or central crown sections, as well as a securing material for securing the light element to the first side, second side, or central crown sections, with the securing material configured to secure the light element to sections without puncturing the body of the emergency vehicle.

18 Claims, 5 Drawing Sheets

(56) References Cited

U.S. PATENT DOCUMENTS

| | | | |
|---|---|---|---|
| 8,454,214 B2 | 6/2013 | Kazaoka | |
| 2004/0252021 A1* | 12/2004 | Frank | B60Q 1/2611 |
| | | | 340/472 |
| 2010/0327617 A1* | 12/2010 | Oriet | B62D 31/02 |
| | | | 296/36 |
| 2013/0272007 A1* | 10/2013 | Thibodeau | B60Q 1/2611 |
| | | | 362/516 |
| 2014/0327263 A1* | 11/2014 | Van Arnam | B60Q 1/52 |
| | | | 296/19 |

* cited by examiner

CORNER LIGHT ASSEMBLY FOR EMERGENCY VEHICLE

RELATED APPLICATIONS

This non-provisional patent application claims priority to U.S. Provisional Patent Application Ser. No. 61/948,354 filed Mar. 5, 2014, and entitled "CORNER LIGHT ASSEMBLY FOR EMERGENCY VEHICLE," with the entirety of such provisional patent application incorporated by reference into this non-provisional patent application.

FIELD OF THE INVENTION

Embodiments of the present invention are directed to a corner light assembly for an emergency vehicle. More particularly, embodiments of the present invention are directed to a corner light assembly sized and shaped to precisely fit about the contours of an extruded roof crown for an emergency vehicle.

BACKGROUND

Emergency vehicles are generally required to include various types of visual warning lights to provide awareness and warning to persons in the vicinity of the emergency vehicles. Such lights may include hazard lights, beacons, light bars, or various modifications or combinations thereof. Often, state and local jurisdictions may institute specific requirements on the type and number of warning lights that emergency vehicles are required to include.

Ambulance-type emergency vehicles are often required to carry one or more warning lights on the upper four corners of a patient compartment associated with the ambulance. In some instances, such warning lights, known generally as corner lights, may simply include marker lights, which are lights having a single luminous intensity. In other instances, the corner lights for ambulances may be required to strobe, flash, or perform other types of luminous intensity changes.

In general, previously-used corner lights are often comprised of single-bulb lights encased in a plastic housing. Such corner lights are generally secured to the corners of the emergency vehicle by way of multiple fasteners that are required to puncture the body of the emergency vehicle. In addition to the vehicle punctures required for installation and securement of the corner lights, current corner lights also require the vehicle to include one or more additional holes for wiring to provide power and/or to control the lights. Such punctures and holes are known to cause vehicle damage due to exposure to moisture and other environmental effects.

Furthermore, previously-used corner lights generally consist of off-the-shelf light products that are not formed to fit precisely about the contours of the emergency vehicles. As such, previously-used corner lights often appear bulky because they do not aesthetically follow the outline and contours of the vehicles.

Thus, there exists a need for a corner light assembly that fits precisely about the contours of the emergency vehicle and that can be secured to the emergency vehicle without requiring multiple punctures or holes to be made through the vehicle.

SUMMARY OF THE INVENTION

In one embodiment of the present invention, there is provided a corner light assembly for an emergency vehicle. The light assembly comprises a first side crown section configured to extend laterally along at least a portion of a first side of a body of the emergency vehicle, a second side crown section configured to extend laterally along at least a portion of a second side of the body of the emergency vehicle, and a central crown section positioned between the first and second crown sections. The central crown section is configured to be positioned on a corner between the first and second sides of the body the emergency vehicle. The light assembly additionally comprises at least one light element including a light source, secured to an exterior surface of one of the first side, second side, or central crown section. The light assembly further comprises a securing material for securing the light element to the first side, second side, or central crown section, with the securing material being configured to secure the light element to the first side, second side, or central crown section without puncturing the body of the emergency vehicle.

In another embodiment of the present invention, there is provided an emergency vehicle with a corner light assembly. The vehicle includes a cab, a patient compartment, a first side crown section configured to extend laterally along at least a portion of a first side of patient compartment of the emergency vehicle, a second side crown section configured to extend laterally along at least a portion of a second side of the patient compartment of the emergency vehicle, and a central crown section positioned between the first and second crown sections. The central crown section is configured to be positioned on a corner between the first and second sides of the patient compartment of the emergency vehicle. The emergency vehicle additionally comprises a plurality of light elements each including a light source, wherein at least one of said light elements is secured to an exterior surface of each of the first side, second side, and central crown sections. The light assembly further comprises a securing material for securing the light elements to the first side, second side, and central crown sections, with the securing material being configured to secure the light elements to the first side, second side, and central crown section without puncturing the patient compartment of the emergency vehicle.

In yet another embodiment of the present invention, there is provided a method for forming a corner light assembly for an emergency vehicle. The method comprises the initial steps of extruding a first crown piece having a curvilinear lateral cross-section and extruding a second crown piece having a curvilinear lateral cross-section. An additional step includes forming a central crown piece having at least two edges, with a first edge corresponding to the cross-section of the first crown piece and a second edge corresponding to the cross-section of the second crown piece. An additional step includes securing the first edge of the central crown piece to an end of the first crown piece and securing the second edge of the central crown piece to an end of the second crown piece. A further step includes securing to each of the first, second, and central crown pieces, an individual light element comprising a light source. The light elements that are connected to the first and second crown pieces have bottom surfaces with lateral cross-section profiles that correspond with the lateral cross-section profiles of the first and second crown pieces, respectively.

BRIEF DESCRIPTION OF THE FIGURES

Embodiments of the present invention are described herein with reference to the following drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
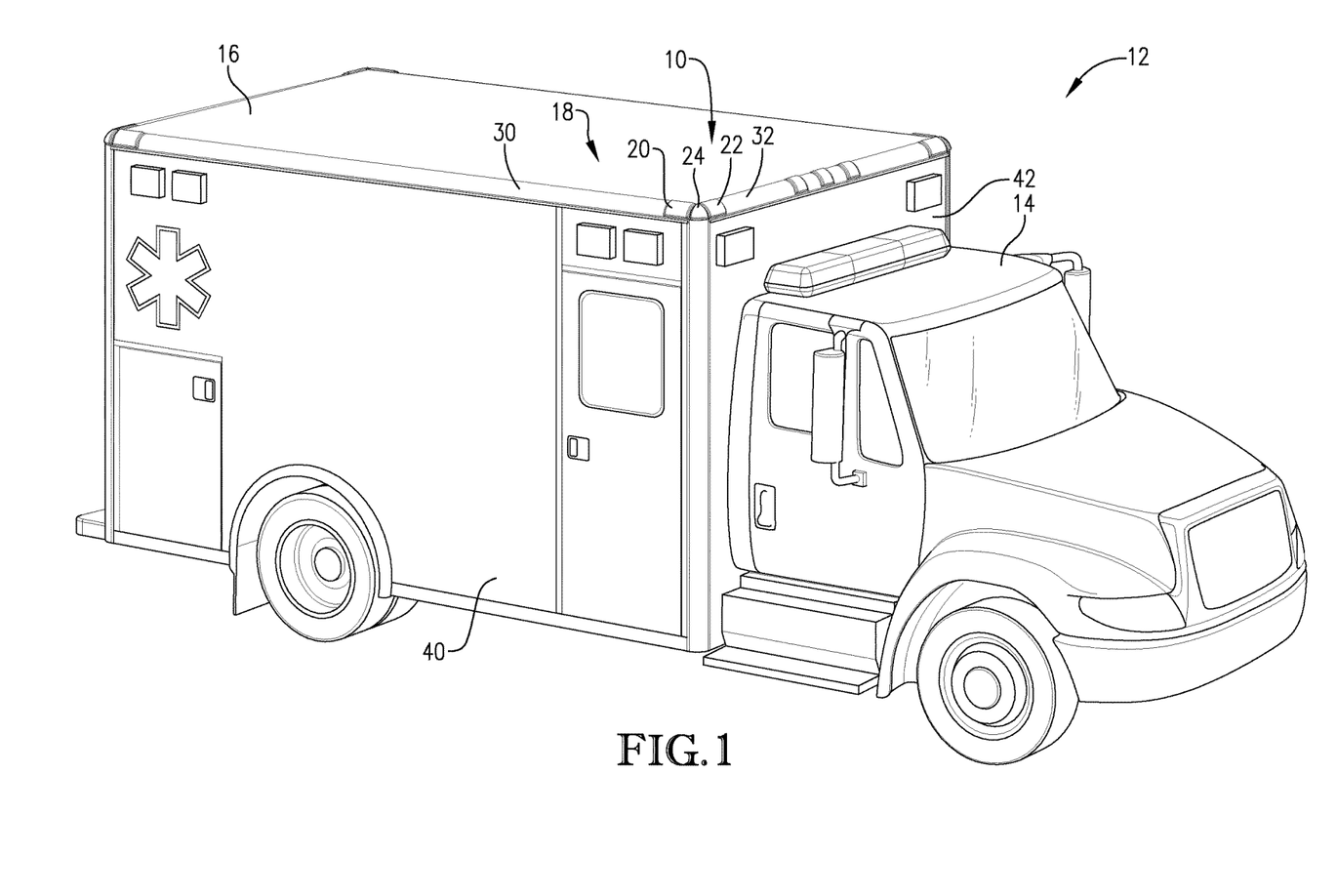
FIG. 1 is a perspective view of an emergency vehicle including a light assembly according to embodiments of the present invention.

With reference to the figures, embodiments of the present invention are directed to a corner light assembly 10 for an emergency vehicle 12. As shown in FIG. 1, the emergency vehicle 12 may be in the form of an ambulance-type vehicle, comprising a cab 14 and a patient compartment 16. As such, an operator of the emergency vehicle 12 can operate the vehicle 12 from the cab 14, while a patient can be treated within the patient compartment 16. Embodiments of the present invention provide for the emergency vehicle 12 to include the corner light assembly 10, which broadly comprises an extruded roof crown 18 for encircling a roof of an emergency vehicle, a first side-light element 20 and a second side-light element 22 extending along at least a portion of the roof crown 18, and a central light element 24 positioned on the roof crown 18 between the first and second side-light elements 20, 22. In certain embodiments, the light elements 20, 22, 24 are shaped to correspond with the roof crown 18, such that the light elements 20, 22, 24 fit precisely about the roof crown 18.

Embodiments of the present invention provide for the roof crown 18 to be formed from various materials of sufficient strength and durability to be used on an exterior of the emergency vehicle 12. For example, the roof crown 18 may be formed from steel, aluminum, natural polymers, synthetic polymers, or the like. The roof crown 18 may preferably be formed from an extrusion process, such that portions of the roof crown 18 have lateral cross-sections that are generally consistent throughout lengths of such portions. In other embodiments, the roof crown 18 may be formed by other processes, such as molding, milling, or the like.

Figure 2:
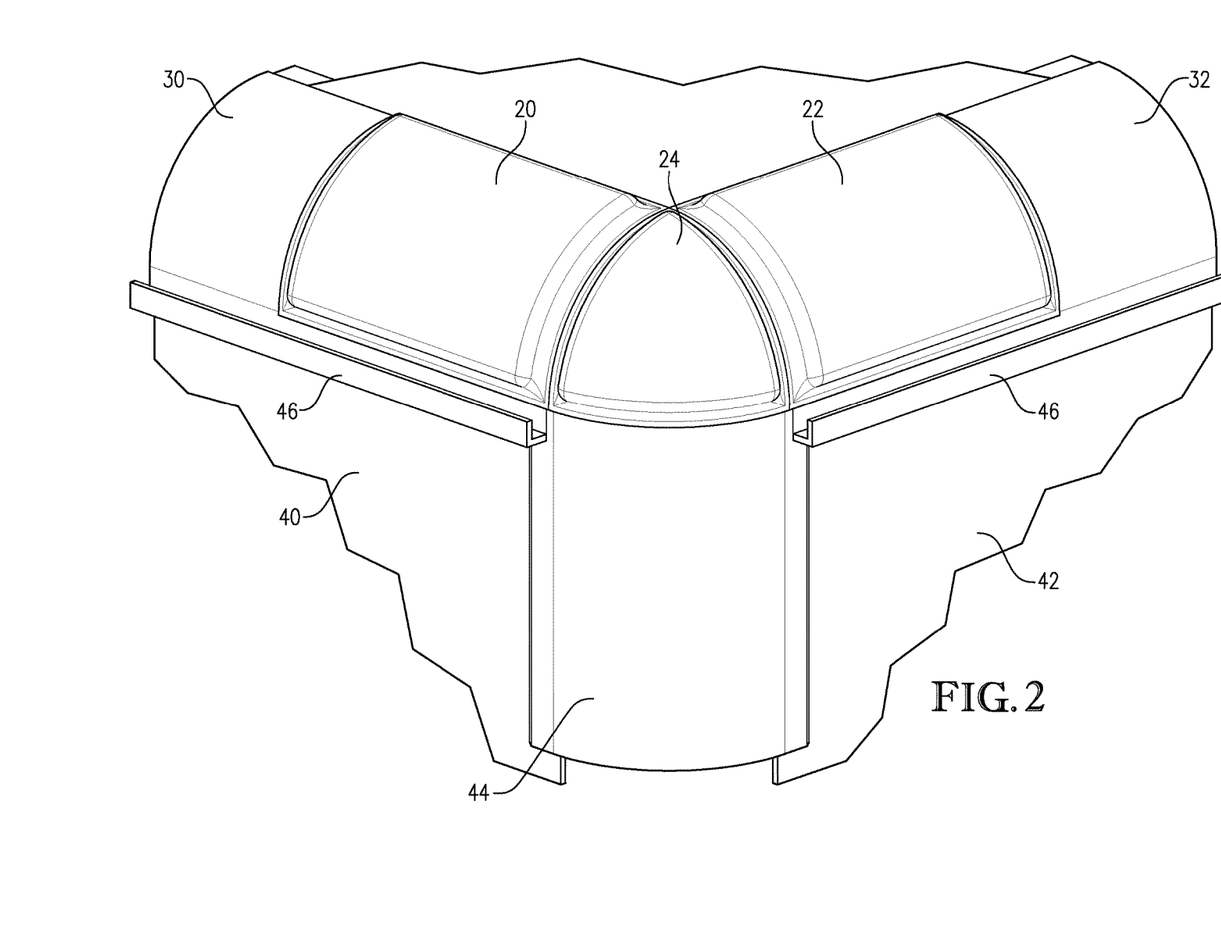
FIG. 2 in a partial isometric view of a corner light assembly for an emergency vehicle according to embodiments of the present invention, particularly illustrating portions of a roof crown and a first light element, a second light element, and a central light element secured to the roof crown.
Figure 3:
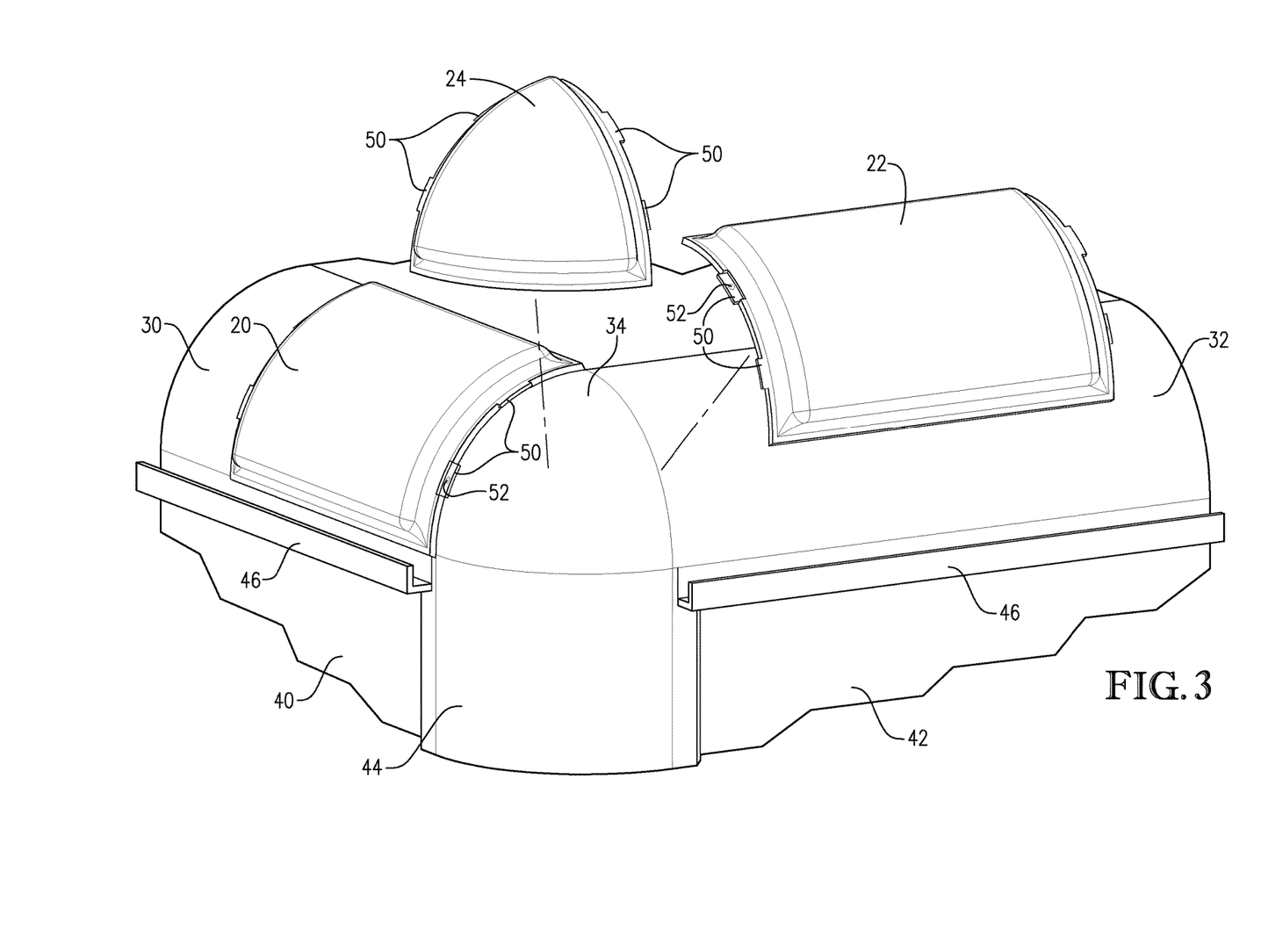
FIG. 3 is a partial exploded view of a corner light assembly according to embodiments of the present invention, particularly illustrating light elements being interconnectable via connection components.

With reference to FIGS. 2-3, in some embodiments, the roof crown 18 will comprise a first crown section 30 and a second crown section 32, with the first and second crown sections 30, 32 separated by a central crown section 34 (out of view in FIG. 2). The first and second crown sections 30, 32 will extend generally horizontally, and in some embodiments, will extend away from each other generally perpendicularly (i.e., at a right angle). As such, the first crown section 30 is operable to extend along a first side 40 of the patient compartment 16 of the emergency vehicle 12, while the second crown section 32 is operable to extend along a second, adjacent side 42 of the patient compartment 16 of the emergency vehicle 12. With reference to FIG. 3, the central crown section 34 may be positioned between the first and second crown sections 30, 32 and functions to cover a corner of the emergency vehicle 12 between the first and second crown sections 30, 32. Furthermore, in some embodiments, the roof crown 18 may include a third crown piece 44. The third crown section 44 may extend generally vertically from adjacent the first and second crown sections 30, 32, with such extension being generally perpendicular (i.e., at a right angle) to the first and second crown sections 30, 32. As such, the third crown section 44 may extend along an edge of the patient compartment 16 of the emergency vehicle 12, so as to separate at least a portion of the first and second sides 40, 42 of the emergency vehicle 12.

Figure 4:
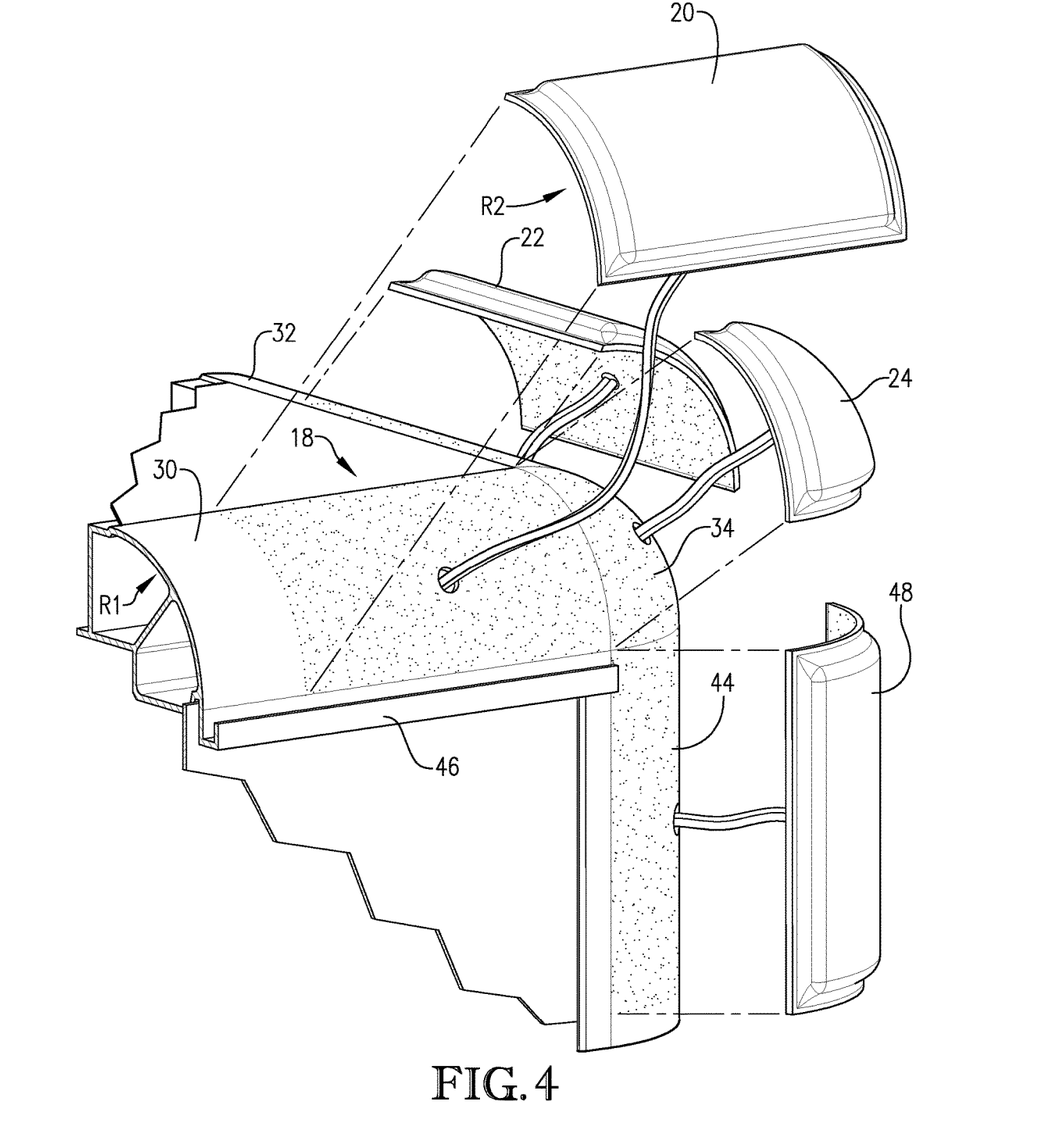
FIG. 4 is partial exploded view of a light assembly according to embodiments of the present invention, particularly illustrating four light elements being secured to a roof crown via a securing material.

In some embodiments, such as illustrated in the drawings and as perhaps best illustrated in FIG. 4, sections the roof crown 18 may have a curvilinear lateral cross-section. For example, the roof crown 18 may include a lateral cross-section having a radius of curvature R1 of approximately 3 inches. However, in other embodiments, the lateral cross-section of the roof crown 18 may have a radius of curvature R1 between approximately 0.5 inches to about 3 inches, from about 3 inches to about 6 inches, or greater than 6 inches. In such embodiments in which the roof crown 18 includes the curvilinear cross-section, an exterior surface of the roof crown 18 will have a shape that corresponds to such lateral cross-section. In other embodiments, the roof crown 18 may have an arcuate lateral cross-section with multiple curvilinear portions. In still other embodiments, the roof crown 18 may have a lateral cross-section with multiple linear segments or formed with various other shapes and/or combinations of shapes.

In some embodiments, such as illustrated in FIGS. 2-4, certain portions of the roof crown 18 may include a drip rail 46 that extends along a lower edge of the roof crown. The drip rail 46 may be operable to provide a path for excess water to travel when the emergency vehicle 12 operates in precipitations and/or in inclement weather. In some embodiments, only the horizontally-orientated portions of the roof crown (e.g., first and second crown sections 30, 32) will include drip rails 46, such that the vertically-orientated portions (e.g., third crown section 44) may not include drip rails 46.

The central crown section 34, which separates the first and second crown sections 30, 32, may be of a specific size and shape so as to form a continuous connection between such first and second crown sections 30, 32. For example, if the roof crown 18 has a curvilinear cross-section, with a 3 inch radius of curvature R1, then the central crown section 34 may be formed as a section of a sphere (e.g., a spherical triangle) with a 3 inch radius. As such, side edges of the central crown section 34 may correspondingly align with end edges of the first and second crown sections 30, 32. In embodiments of the present invention that include the third crown section 44, the central crown section 34 may have a bottom edge that correspondingly aligns with an end edge of the third crown section 44. In other embodiments, the lateral cross-section of the roof crown 18 may have different shapes (e.g., arcuate with multiple curvilinear portions). In such embodiments, the central crown section 34 may have a corresponding shape, so as to form a continuous connection between the first and second crown sections 30, 32.

In some embodiments, the central crown sections 34 will be formed from the same material, from which the first, second, and third crown sections 30, 32, 44 are formed (e.g., metal or polymer). In embodiments in which the roof crown 18 is formed from a metal (e.g., aluminum), the central section 34 may be secured to the first, second, and/or third crown sections 30, 32, 44 by welding (e.g., stick welding) or the like. Alternatively, in embodiments in which the roof crown 18 is formed from a polymer, the central section 34 may be secured to the first, second, and/or third crown sections 30, 32, 44 via welding (e.g., laser welding), heat treatment, adhesives, or the like.

Remaining with FIGS. 2-4, regardless of the size and shape of the roof crown 18, embodiments of the present invention include the first and second light elements 20, 22 that fit precisely along at least a portion of the outer surfaces of the first and second crown sections 30, 32 of the roof crown 18, respectively. For example, if the roof crown 18 has a curvilinear cross-section, with a 3 inch radius of curvature R1, the first and second light elements 20, 22 may have a corresponding curvilinear cross-section that has a radius of curvature R2 (See, e.g., FIG. 4) slightly greater than 3 inches. As such, the first and second light elements 20, 22 can be positioned adjacent to the first and second crown sections 30, 32, respectively, such that inner surfaces of the light elements 20, 22 flushly overlay the outer surfaces of the first and second crown sections 30, 32. Furthermore, as perhaps best illustrated in FIG. 2, the first and second light elements 20, 22 may be positioned above the drip rails 46, such that the light elements 20, 22 will not be interfered with by the drip rails 46 or from water traveling therethrough.

Embodiments of the present invention may additionally include the central light element 24 that is sized and shaped to correspond with the central crown section 34 of the roof crown 18. As such, the central light element 24 can be positioned adjacent to the central crown section 34, such that an inner surface of the central light element 24 flushly overlays an outer surface of the central crown section 34 of the roof crown 18. Finally, some embodiments, such as illustrated in FIG. 4, may include a third light element 48 that fits along the roof crown 18 adjacent to the third crown section 44 of the roof crown 18. In particular, the third light element 48 can be positioned adjacent to the third crown section 44, such that an inner surface of the third light element 48 flushly overlays an outer surface of the third crown section 44 of the roof crown 18.

Embodiments of the present invention provide for the first, second, third, and central light sections 20, 22, 48, and 24 (collectively, the "light elements") to each comprise a housing, which may be presented in the form of a lens. The housings of the light elements may be formed having a plurality of thicknesses. As such, in some embodiments, the light elements will be approximately 0.25 inches to approximately 0.5 inches thick. In other embodiments, the light elements can be less than about 0.25 inches or greater than about 0.5 inches thick. The housings of the light elements may be formed from various polymers, such as transparent or semi-transparent plastics. In some embodiments, the housings may be colored, such that the light elements are operable to emit colored light. For example, the housing may be red, yellow, orange, blue, or any other color or combination of colors as may be required.

The light elements can be secured to the roof crown 18 by various methods of attachment. In some embodiments, for example, a double-sided adhesive tape may be used to secure the inner surfaces of the light elements directly to the outer surfaces of the roof crown 18. In other embodiments, various other types of adhesives may be used, such as solid adhesives, liquid adhesives, gel adhesives, or the like. In For instance, as illustrated in FIG. 4, the adhesives may specifically include glues, cements, mucilage, pastes, or the like. As such, embodiments of the present invention provide for the light elements to be secured to the roof crown 18 of the emergency vehicle 12 without requiring for the passenger compartment 16 of the vehicle 12 to be penetrated with holes for fasteners for securing the light elements.

In some embodiments, such as illustrated in FIG. 4, each of the first light element 20, the second light element 22, and the central light element 24 may be individual components that are each configured to be separately secured to the roof crown. In other embodiments, the light sections may be an integral unit, such that the first light element 20, the second light element 22, and the central light element 24 comprise a single, unified light element configured to be secured to the roof crown 18 as a single component. In still other embodiments, as illustrated in FIG. 3, the first light element 20, the second light element 22, and the central light element 24 may be individual modular components formed to interconnect with each other. In such embodiments, the light elements may include connection components 50 in the form of snap-fit joints, latches, clips or the like, with such connection components 50 configured to allow the light elements to be physically interconnected with each other. In some further embodiments, the connection components 50 of the light elements may include electrical components 52 necessary to transmit electrical signals and/or electrical power, such as electrical plugs, sockets, wiring, and like. As such, any one of the light elements can provide power or control communication to another interconnected light element.

Embodiments of the present invention provide for the light elements to include various types of light sources for purposes of providing illumination. For example, such light sources may include incandescent bulbs, florescent bulbs, light-emitting diodes (LEDs), or the like. In some embodiments, the light sources receive power from an electrical power source, such as a battery, a generator, an alternator, or the like. In some embodiments, the electrical power source may be internal to the light elements. For instance, the light elements may include one or more internal batteries for providing electrical power to the light sources. In other embodiments, such as illustrated in FIG. 4, the electrical power sources may be separate from the light elements, in which case the light elements are electrically connected to the electrical power sources by way of electrically conductive wires, cables, or the like. If the light elements are connected to the electrical power source by wire, the body of the vehicle may be required to include at least one hole through which the wire is operable to pass between the light elements and the electrical power source. In some embodiments, as previously described with reference to FIG. 3, the light elements may be modular, such that if electrical power is provided to one of the light elements, such one light element can further provide power to adjacent light elements via the electrical connection components 52 included with the light elements. Furthermore, embodiments of the present invention may provide for magnetic induction power transfer. In such embodiments, the electrical power source may be associated with a transmitter and the light elements may include a receiver. As such, the electrical power source can emit an oscillating electromagnetic field via the transmitter, with such field inducing a current in the receiver for conversion to usable power for operating the light source in the light elements. In such instances, the power source is capable of proving power to the light elements without requiring holes, or other types of openings, being formed through the patient compartment 16.

In some embodiments, the light elements are operable to act as marker lights, such that the light sources within the light elements are configured to illuminate at a single intensity. In other embodiments, the light elements are operable to act as strobe-lights, flashing lights (e.g., for emergency situations), blinking lights (e.g., for use as turning indicators), or the like, such that the light elements can vary the intensity of their illumination. In some embodiments, the varying intensity of the illumination can be controlled by a control unit, such as a manual switch, an integrated circuit, microcontroller, a field-programmable gate array, a programmable logic controller, or the like. In some embodiments, the control unit may be included within the light elements. In embodiments that include the light elements with the electrical connection components 52, only one of the light elements may include the control unit and control signals may be provided to the other light elements via the electrical connection components 52. In other embodiments, the control unit may be located apart from the light elements, such as within an interior of the emergency vehicle 12. As such, certain embodiments may provide for a control wire, such as illustrated in FIG. 4, to pass from the control unit to the light elements. As with wires from the electrical power source, wiring from the control unit may also extend through a hole in the passenger compartment 16 of the emergency vehicle 12. In some embodiments, the hole for the control unit wiring may be the same hole used for the wiring from the electrical power source. As such, embodiments of the present invention may include a pair of wires for each of the light elements (e.g., a power wire and a control wire), with such pair of wires configured to pass through a single hole in the passenger compartment 16.

Figure 5:
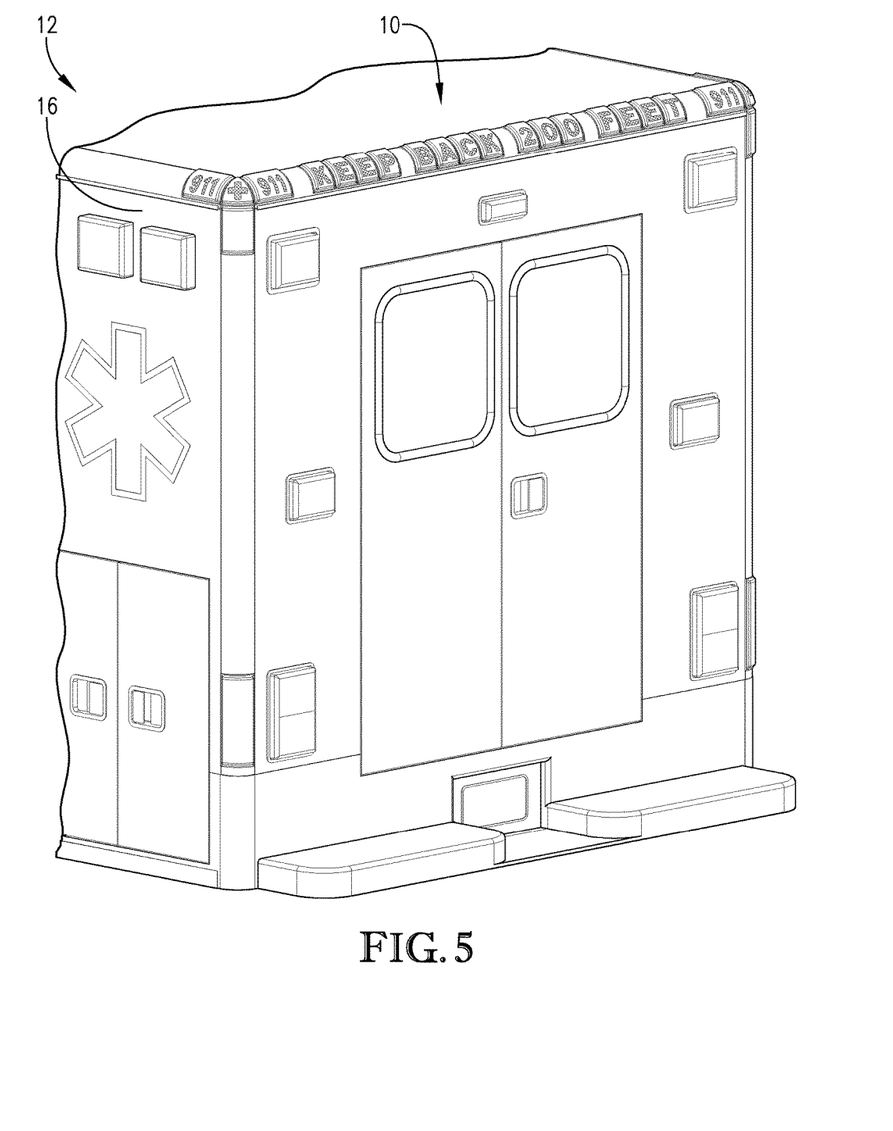
FIG. 5 is a partial perspective view of a rear portion of an emergency vehicle, with the vehicle including a light assembly according to embodiments of the present invention.

The light elements may each include various numbers of light sources, such as LEDs, positioned at various locations within the light element. As such, the light sources may be arranged within the light elements so as to display various types of text, graphics, images or the like. In other embodiments, the illumination of the individual light sources within the light elements may be controlled by the control unit, such that the light elements are operable to display text, graphics, images, or the like by controlling the luminosity of each individual light source. In still further embodiments, the housing of light elements may be formed with engravings, markings, or etchings, so as to act as a lens to focus the light emitted from the light sources. Such engravings, markings, or etchings may be formed with a laser or mechanical cutting means. In such embodiments, the engravings, markings, or etchings may provide for the light elements to display various text, graphics, images, or the like. For instance, as shown in FIG. 5, the light elements may be positioned so as illustrated a message, such as "KEEP BACK 200 FEET." It is understood that such messages can be displayed by controlling the functionality of the individual light sources within the light elements or via engravings/etchings included on the housing of the light elements.

In some embodiments, such as shown in FIG. 1, the roof crown 18 may extend entirely around a perimeter of the roof of the patient compartment 16 of the emergency vehicle 12, including each of the four sides and four corners of the compartment. As such, each of the first and second crown sections 30, 32 can extend, from the central crown section 34, across an entire side of the patient compartment 16 to additional central crown sections positioned on adjacent corners of the patient compartment 16. Similarly, additional crown sections can extend across the remaining sides of the patient compartment 16 to a final central crown section opposite the original central crown section 34, such that the entire roof of the patient compartment 16 is lined with the roof crown 18. In addition, embodiments of the present invention provide for the light elements to be positioned on the roof crown 18 along the entire perimeter of the patient compartment 16. As such, the entire perimeter of the roof of the patient compartment 16 can be illuminated with light elements. For instance, by providing for light elements to be included along the perimeter of the emergency vehicle's 12 patient compartment 16, embodiments of the present invention can provide for various messages to be displayed, such as "KEEP BACK 200 FEET" as shown in FIG. 5. In some embodiments, light elements may be positioned about various portions of the roof crown 18, but may not extend about the entire perimeter of the roof. For instance, as shown in FIGS. 1 and 5, light elements may be positioned on the roof crown 18 intermediate between the corner light assemblies 10. Such intermediately-positioned light elements may be used as marker lights, emergency lights, turning indicators, braking indicators, or the like. For instance, the three light elements positioned between the corner light assemblies 10 on the front side of the patient compartment 16 shown in FIG. 1 may comprise marker lights. It should be understood, however, that instead of the three individual light elements shown in FIG. 1, such marker lights may comprise a single light element with at least three lights sources included within such light element's housing. In some additional embodiments (not shown in the drawings), the back side of the patient compartment 16 may include one or more light elements positioned between the corner light assemblies 10, with such light elements configured to have their luminosity increase when the vehicle's 12 brakes are applied. Thus, such light elements can act as braking indicators, which provide an indication and warning that the vehicle 12 is slowing down and/or stopping.

Furthermore still, each of the four edges of the patient compartment 16, extending downward from the central crown sections, can be lined with extrusion pieces (e.g., the third crown sections 44). As such, light elements can be positioned on such third crown sections 44, such that each of the four edges of the patient compartment 16 can be illuminated with the light elements.

Although this invention has been described with its preferred embodiment(s), it is noted that equivalents may be employed and substitutions made herein without departing from the scope of the invention.

What is claimed is:

1. A corner light assembly for an emergency vehicle, said light assembly comprising:
    a first side crown section configured to extend laterally along at least a portion of a first side of a body of the emergency vehicle;
    a second side crown section configured to extend laterally along at least a portion of a second side of the body of the emergency vehicle;
    a central crown section positioned between said first crown section and said second crown section, wherein said central crown section is configured to be positioned on a corner between the first and second sides of the body the emergency vehicle,
    wherein each of said first side crown section, said second side crown section, and said central crown section has a curved exterior surface;
    at least three light elements, each including a light source, wherein one light element is secured to the exterior surface of each of said first side crown section, said second side crown section, and said central crown section,
    wherein each light element includes a curved inner surface that corresponds with the curved exterior surface of one of said first side crown section, said second side crown section, or said central crown section, such that said light elements are configured to flushly overlay said first side crown section, said second side crown section, and said central crown section; and
    a securing material for securing said light elements to said first side crown section, said second side crown section, and said central crown section, wherein said securing material is configured to secure said light elements to said first side crown section, said second side crown section, and said central crown section without puncturing the body of the emergency vehicle.

2. The light assembly of claim 1, wherein said first side crown section and said second side crown section have a curvilinear lateral cross-section.

3. The light assembly of claim 2, wherein the lateral cross-sections of said first side crown section and said second side crown section have a radius of curvature of between 2 to 4 inches.

4. The light assembly of claim 1, wherein said first side crown section and said second side crown section extend generally perpendicular with respect to each other.

5. The light assembly of claim 4, further comprising a third crown section extending vertically along at least a portion of an edge of the body of the emergency vehicle, wherein said third crown section extends generally perpendicular to said first side crown section and said second side crown section.

6. The light assembly of claim 1, wherein said first side crown section and said second side crown section are formed from aluminum via an extrusion process.

7. The light assembly of claim 1, wherein each of said first side crown section and said second side crown section is formed with a drip rail extending along a length of said side crown section, and wherein said light elements are positioned above said drip rails.

8. The light assembly of claim 1, wherein said light elements each includes physical connection components that provide for said light elements to physically interconnect with each other.

9. The light assembly of claim 8, wherein said physical connection components include electrical connection components that provide for said light elements to electrically interconnect with each other.

10. The light assembly of claim 1, wherein one or more of said light elements is formed with etchings for focusing light emitted from said respective light source of said light element, such that the etchings are configured to display text and/or graphical designs.

11. The light assembly of claim 1, wherein said light elements are formed from a partially transparent polymer, so as to present a lens through which said light sources can emit light.

12. The light assembly of claim 11, wherein the partially transparent polymer is red.

13. The light assembly of claim 1, wherein said light sources comprise light emitting diodes.

14. The light assembly of claim 1, further comprising a power source for providing power to said light sources, and wherein said power source is external to said light elements.

15. The light assembly of claim 1, further comprising a controller for controlling said light sources, and wherein said controller is housed within one of said light elements.

16. An emergency vehicle with a corner light assembly, said vehicle comprising:
    a cab;
    a patient compartment;
    a first side crown section extending laterally along a first side of said patient compartment;
    a second side crown section extending laterally along a second side of said patient compartment;
    a central crown section positioned between said first crown section and second side crown section, wherein said central crown section is positioned on a corner of said patient compartment,
    wherein each of said first side crown section, said second side crown section, and said central crown section has a curved exterior surface; and
    a plurality of light elements each having a light source therein, wherein at least one of said light elements is secured to an exterior surface of each of said first side crown section, said second side crown section, and said central crown section,
    wherein each light element in said plurality of light elements includes a curved inner surface that corresponds to the curved exterior surface of one of said first side crown section, said second side crown section, or said central crown section, such that said light elements in said plurality of light elements are configured to flushly overlay said first side crown section, said second side crown section, and said central crown section; and
    a securing material for securing said light elements to said first side crown section, said second side crown section, and said central crown section, wherein said securing material is configured to secure said light elements to said first side crown section, said second side crown section, and said central crown sections without puncturing said patient compartment of said emergency vehicle.

17. The emergency vehicle of claim 16, further comprising— a third side crown section extending laterally along a third side of said patient compartment;

a fourth side crown section extending laterally along a fourth side of said patient compartment, wherein at least one of said light elements is secured to an exterior surface of at least a portion of each of said third side crown section and said fourth side crown section, such that said emergency vehicle is operable to emit light, via said light elements, from each side of said emergency vehicle.

18. A method for forming a corner light assembly for an emergency vehicle, the method comprising the following steps:

extruding a first crown piece having a curvilinear lateral cross-section;

extruding a second crown piece having a curvilinear lateral cross-section, forming a central crown piece having at least two edges, with a first edge corresponding to the cross-section of the first crown piece and a second edge corresponding to the cross-section of the second crown piece;

securing the first edge of the central crown piece to an end of the first crown piece and securing the second edge of the central crown piece to an end of the second crown piece; and securing to each of the first crown piece, the second crown piece, and the central crown piece, an individual light element having a light source, wherein the light elements connected to the first crown piece and the second crown piece have bottom surfaces with lateral cross-section profiles that correspond with the lateral cross-section profiles of the first and second crown pieces, respectively, such that the light elements flushly overlay the first crown section and the second crown section, respectively.

\* \* \* \* \*